April 27, 1965 M. D. SWARTZ ETAL 3,180,208
OPTICAL RANGE FINDING DEVICE
Filed June 27, 1962 4 Sheets-Sheet 1

INVENTORS
MARTIN D. SWARTZ
PAUL M. MARASCO
BY
ATTORNEYS

April 27, 1965   M. D. SWARTZ ETAL   3,180,208
OPTICAL RANGE FINDING DEVICE
Filed June 27, 1962   4 Sheets-Sheet 3

INVENTOR.
MARTIN D. SWARTZ
PAUL M. MARASCO
BY
ATTORNEYS:

April 27, 1965   M. D. SWARTZ ETAL   3,180,208
OPTICAL RANGE FINDING DEVICE
Filed June 27, 1962   4 Sheets-Sheet 4

INVENTOR.
MARTIN D. SWARTZ
PAUL M. MARASCO
BY
ATTORNEYS:

United States Patent Office 3,180,208
Patented Apr. 27, 1965

3,180,208
OPTICAL RANGE FINDING DEVICE
Martin D. Swartz, Elkins Park, Pa., and Paul M. Marasco, Haddonfield, N.J., assignors to the United States of America as represented by the Secretary of the Army
Filed June 27, 1962, Ser. No. 207,147
1 Claim. (Cl. 88—2.7)
(Granted under Title 35, U.S. Code (1952), sec. 266)

The invention described herein may be manufactured and used by or for the Government for governmental purposes without the payment to us of any royalty thereon.

This invention relates to optical range finders and more especially to an improved range finding mechanism which is designed (1) to provide on a range indicating dial a scale wherein all the least graduations have about the same value, and (2) to effect important economies in the manufacture and assembly of its various parts. The present application is a continuation-in-part of our copending application Serial No. 842,547, filed September 23, 1959, for "Range Mechanism," now abandoned.

It is customary in optical range finders utilizing the stereoscopic principle to provide a controllable reference point commonly known as a stereo reticle pattern. In finding the range of a target, a range knob is rotated to move a compensating lens which changes the direction in which the target is viewed with the right eye through the right telescope in the range finder. At a certain point, the illusion is created that the target and the stereo reticle pattern are located at the same distance from the observer.

For indicating the range at this point, a dial bearing a range scale is geared to the shaft through which motion is imparted to the compensator lens. This range scale has heretofore been such that the least graduation had different values assigned to it from one end of the scale to another. This variation in the value of the least graduation tends to confusion in reading the range particularly under the stress of combat. It also involves difficulty in the training of non-technical personnel unused to reading such non-equicrescent scale.

The present invention avoids these difficulties by the provision of a range mechanism so designed that the least graduation of the range scale has the same value from one end of the scale to the other. While this new type of range dial is not exactly equicrescent, the spacing of the least graduation varies only by a factor of approximately three. Since only a relatively short portion of the scale is viewed at a time through a window adjacent to the scale, this non-equal spacing is hardly apparent.

The invention will be better understood from the following description when considered in connection with the accompanying drawings and its scope is indicated by the appended claim.

Referring to the drawings.

Figure 1:
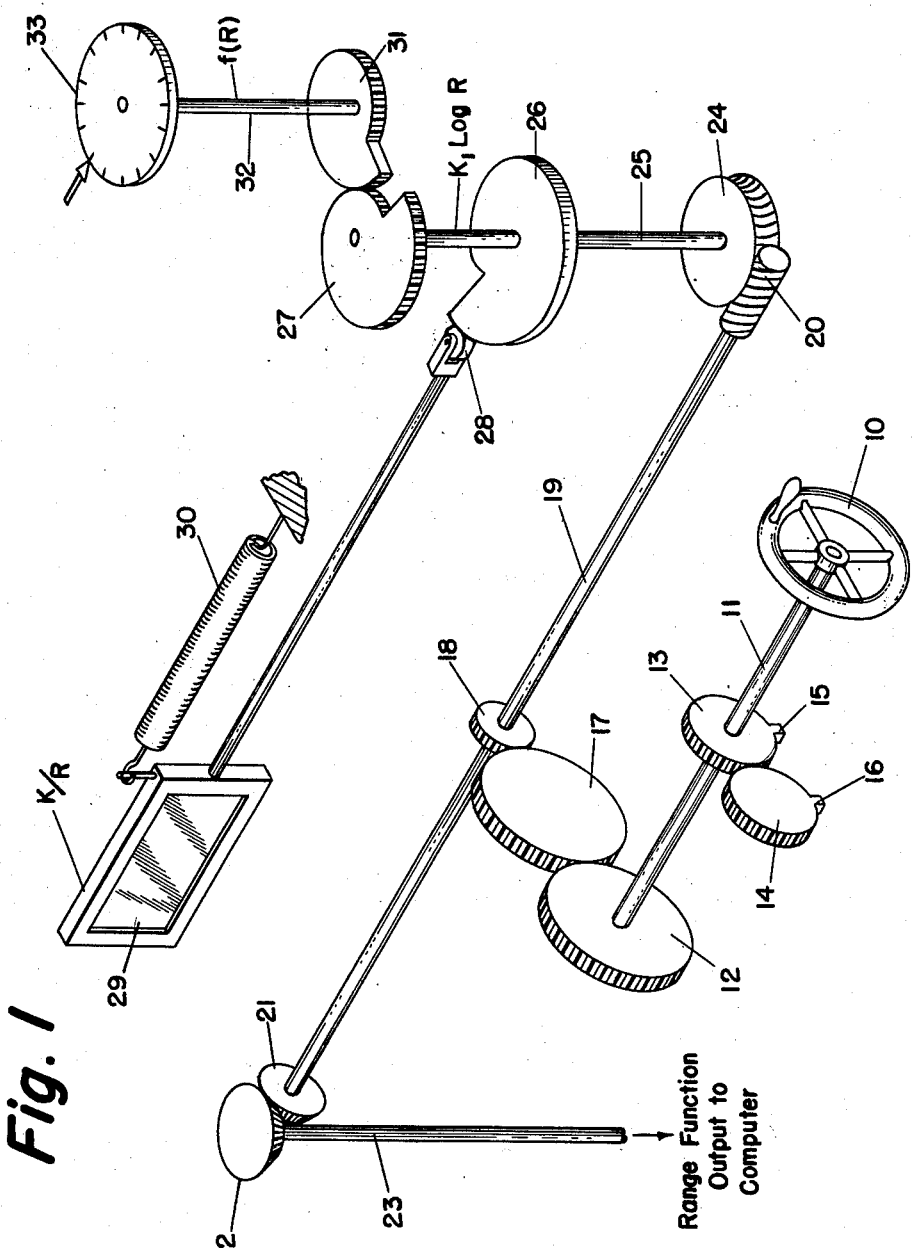
FIG. 1 illustrates a preferred form of the improved range mechanism.

The ranging mechanism of FIG. 1 includes a range knob or handwheel 10 fixed to a shaft 11 for driving a spur gear 12 and spur gears 13 and 14 which are provided with stops 15 and 16 for a purpose hereinafter explained. The gear 12 functions through an anti-backlash spur gear 17 and a gear 18 to drive a shaft 19. Fixed to the shaft 19 are a worm gear 20 and a bevel gear 21. The gear 21 meshes with the bevel gear 22 which is fixed to a range function output shaft 23. This shaft is coupled to a computer (not shown).

Figure 2:
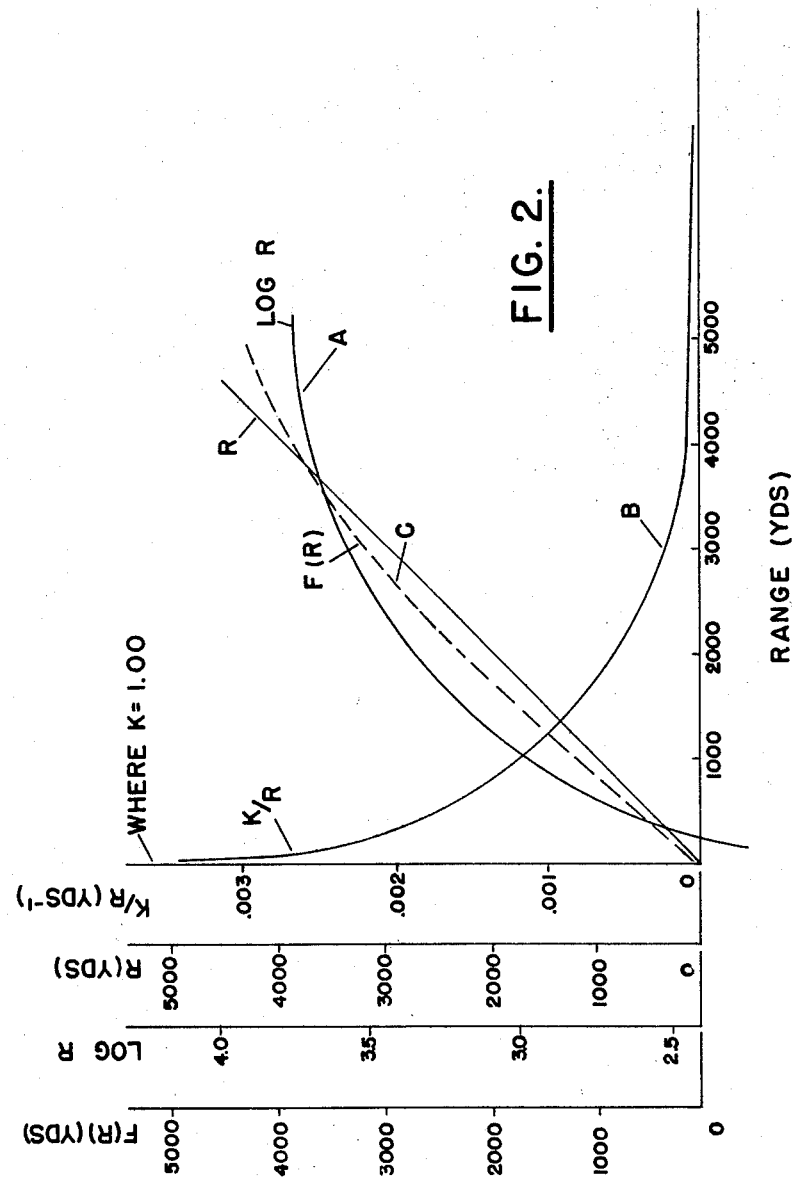
FIG. 2 depicts a group of explanatory curves relating to the operation of the mechanism illustrated by FIG. 1.

The worm 20 cooperates with a worm wheel 24 to drive a shaft 25 to a position proportional to the logarithm of range (see curve A of FIG. 2). Driven by the shaft 25 are a range cam 26 and a non-circular gear 27.

The range cam 26 has a follower 28 which is mechanically coupled to the compensator lens 29 previously mentioned, the lens being so positioned by a spring 30 that the follower 28 is maintained in contact with the cam 26. The cam 26 is so shaped that its lift is proportional to the reciprocal of range (see curve B of FIG. 2). Under these conditions, the movement of the compensator lens 29 is also proportional to the reciprocal of range.

The non-circular gear 27 cooperates with a non-circular gear 31 for driving a shaft 32 to a position which is a function of range (see curve C of FIG. 2). Fixed to the shaft 32 is a range dial 33 bearing a scale in which the least graduations all have substantially the same value as previously explained.

Stops 15 and 16 on spur gears 13 and 14 respectively function to limit the movement of the mechanism so that the follower 28 does not slip over the radial part of the range cam 26 and so that the movement of the non-circular gears 27 and 31 is maintained within the range of their meshing surfaces.

As previously explained, the provision of the non-circular gears 27 and 31 has the important advantage that the least graduations of the range scale are more nearly equal and therefor more easily read. The curves of FIG. 2 represent various functions of range as plotted against range. Thus the $f(R)$ represented by curve A is $K_1 \log R$ and this curve indicates how the position of shaft 25 varies with range. The $f(R)$ represented by curve B is $K/R$ and this curve indicates how the position of the lens 29 changes with range. Similarly the (R) represented by curve C indicates the relation between range and the angular position of the disk 33. The curve R is plotted between range and various values of range. This curve indicates the relation required to make the least graduations of the range scale to have the same value from one end of the scale to another. The value of the constant K is determined by the focal length of the lens 29 and the base length of the range mechanism. The value of the constant $K_1$ is determined by the gearing through which the shaft 25 is driven.

Figure 3:
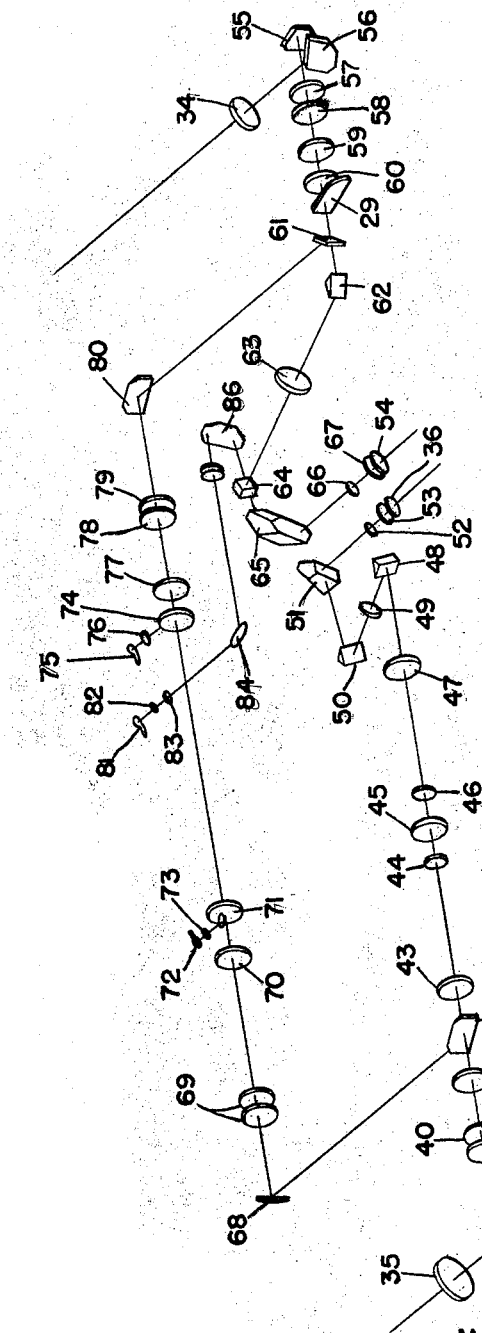
FIG. 3 illustrates an optical system of which the present invention constitutes a part.

The above described and hereinafter claimed mechanism constitutes a part of the optical system of FIG. 3. In the operation of this system, light from a given target enters the range finder through the right and left hand windows 34 and 35 which are spaced apart by a base length of approximately 79 inches. A definite angle exists between the bundles of light from the target arriving at the windows 34 and 35. This angle is known as the triangulation angle and varies with the target distance, becoming larger for close targets and smaller for distant targets. True range can be found by accurate determination of this angle since it is always subtended by the distance between the windows 34 and 35. The purpose of the optical system of FIG. 3 is to enable the operator to determine the value of the triangulation angle by means stereopsis. When this angle has been found, the true range is indicated on the range scale 33.

Light is transmitted from the window 35 to an eye lens 36 by way of penta reflectors 37 and 38, a wedge 39, a window 40, a filter 41, a porro reflector 42, an objective lens 43, a collective lens 44, a sighting reticle 45, a collective lens 46, an erector lens 47, a 90° prism 48, an erector lens 49, a 90° prism 50, an ocular prism 51, a diaphragm 52 and a field lens 53.

Light is transmitted from the window 34 to an eye lens 54 by way of penta reflectors 55 and 56, wedge 57, window 58, filter 59, a stationary compensator lens 60, the movable compensator lens 29, a porro prism 61, a 90° prism 62, an objective lens 63, a beam splitter 64, an ocular prism 65, a diaphragm 66 and a field lens 67.

Associated with these right and left branches of the optical system is a collimator system including porro reflector 68, correction wedges 69, objective lens 70, right stero reticle 71 which is illuminated by a lamp 72 through a diffuser disk 73, left hand stereo reticle 74 which is illuminated by a lamp 75 through a diffuser disk 76, an objective lens 77, a correction wedge 78, an ICS wedge 79 and a porro reflector 80.

Light from a source 81 is applied to the beam splitter 64 by way of diffusion disk 82, an auxiliary sighting reticle 83, a mirror 84, lenses 85 and porro prism 86.

The above described optical system is only one of various optical systems to which the present invention has been applied. It is well known and readily understandable by those skilled in the art without detailed explanation.

Figure 4:
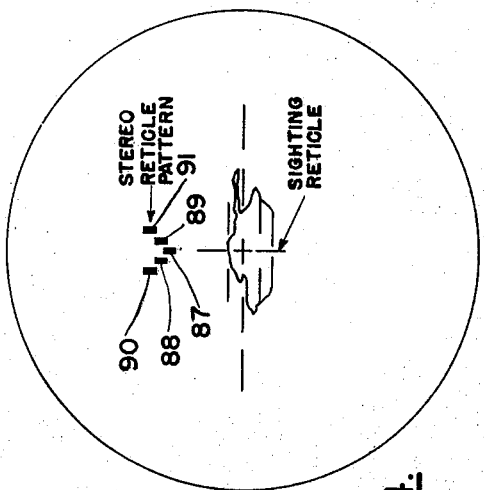
FIGS. 4, 5 and 6 are explanatory diagrams relating to the operation of the optical system depicted by FIG. 3.

It is sufficient to say that the operator makes the binocular parallax of the target identical to that of the central bars of the stereo reticle pattern (FIG. 4) by altering the parallax angles of the target by means of the range compensator 29 (FIG. 1). The degree of alteration necessary to make the target and stereo reticle binocular parallax identical is measured by the range finder and converted into range. Thus the stereo reticle provides a reference point in space and the target is optically brought up to that point in space. Whereas optically the target "moves" in space such a phenomenon is unacceptable in the realm of human experience. It is therefore mentally rejected and the mind sees the stereo reticle wandering back and forth in space, even though the parallactic angles of the stereo reticle to the two eyes are not changed. This shows that it is the relative binocular parallax angle only that is essential to depth discrimination by means of stereopsis. The entire range finder is concerned with keeping track of the relative target parallax angle with respect to the stereo reticle parallax angle and providing the resultant information in a useful form.

Figure 6:
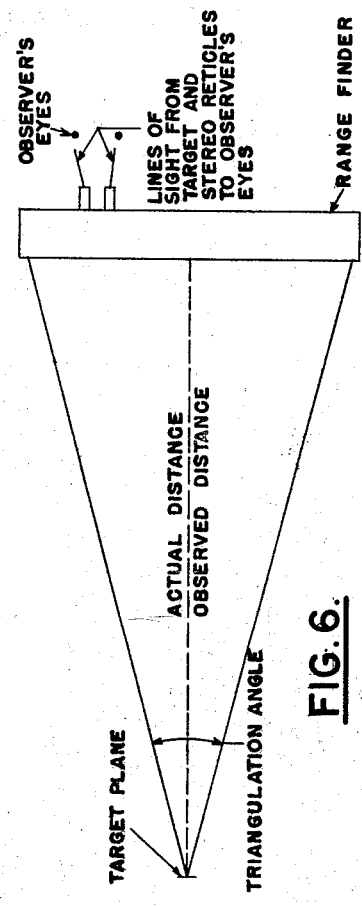
Figure 5:
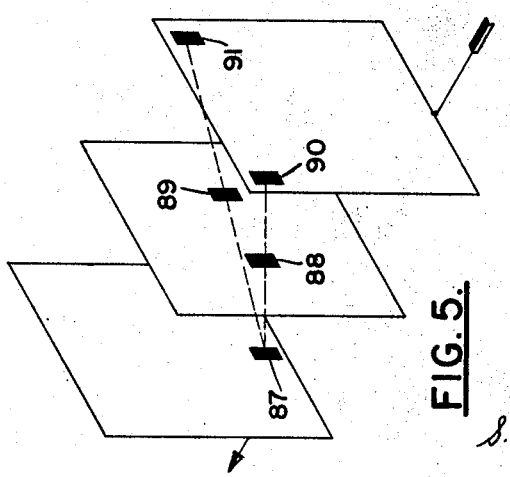

The range finder permits this to be accomplished by creating artificially what appears to be five luminous objects suspended in space (FIGS. 5 and 6) and arranged in what is known as a stereo reticle pattern. This stereo reticle pattern appears to have a third dimension creating the appearance of five vertical bars 87 to 91, apparently equally spaced laterally, but at different distances from the observer. The vertical bar 87 in the center of the pattern laterally appears to be farthest from the observer and is the reference point which is used in ranging. The bars 88 to 91 are for the purpose of helping in the location of the bar 87 in visual space.

Such location of the bar 87 is effected by varying the actual spaces between the bars in the left and right stereo reticles 74 and 71 (FIG. 3) in such a manner that the light arrives at the observer's eyes from the same direction as would light from the actual object located in space where the bars appear to be. Thus it is by comparison of the apparent relative distance between a given target and the stereo reticle pattern that range is actually determined. Otherwise stated, the visual task is to make the target appear to be at the same distance (FIG. 6) from the observer as the stereo reticle regardless of its true or apparent distance. This is accomplished by turning the range knob 10 (FIG. 1) and moving the compensator lens 29 to change the direction in which the target is viewed with the right eye through the right telescope 34 and 55 to 67 and 54 (FIG. 3). At a certain point, the illusion is created that the target and the stereo reticle pattern are located at the same distance from the observer. At this point the range of the target is indicated by the dial 33.

We claim:

In an optical range finding mechanism for determining distance of a target, said range finding mechanism including a stereo reticle pattern therewithin and means for observing said target and said reticle pattern, the combination with said range finding mechanism of
  a compensating lens,
  means for positioning said lens to create an illusion that said target and said reticle pattern are located at the same distance from an observer,
  said positioning means comprising
    a first shaft,
    a handwheel for rotating said shaft,
    a pair of spur gears rotatable with said shaft,
    said spur gears having stops thereon,
    a second shaft,
      gear means cooperating between said first shaft and said second shaft for rotating said second shaft in accordance with rotation of said first shaft,
    worm gear means at one end of said second shaft for driving a third shaft to a position proportional to the logarithm of range,
  a range cam fixed to said third shaft,
  a cam follower responsive to the movement of said range cam,
  said compensating lens moving in accordance with said cam follower responsive to motion of said range cam such that movement of said compensating lens is proportional to the reciprocal of range,
  a range dial rotatable in accordance with movement of said range cam through a pair of non-circular gears,
  said stops on said spur gears limiting the movement of said cam follower on said range cam by limiting the movement of said non-circular gears,
  said non-circular gears controlling rotation of said range dial having substantially equicrescent graduations thereon.

References Cited by the Examiner
UNITED STATES PATENTS

| | | | |
|---|---|---|---|
| 1,322,751 | 11/19 | Barr et al. | 88—2.7 |
| 2,190,541 | 2/40 | French | 88—2.7 |
| 2,401,707 | 6/46 | Mihalyi et al. | 88—2.7 |
| 3,079,833 | 3/63 | Malinowski | 88—2.7 |

FOREIGN PATENTS 815,329   6/59   Great Britain.

JEWELL H. PEDERSEN, *Primary Examiner.*